Jan. 9, 1968　　R. LITWINOFF　　3,362,383
COMBUSTION CHAMBER WALL
Filed May 17, 1966
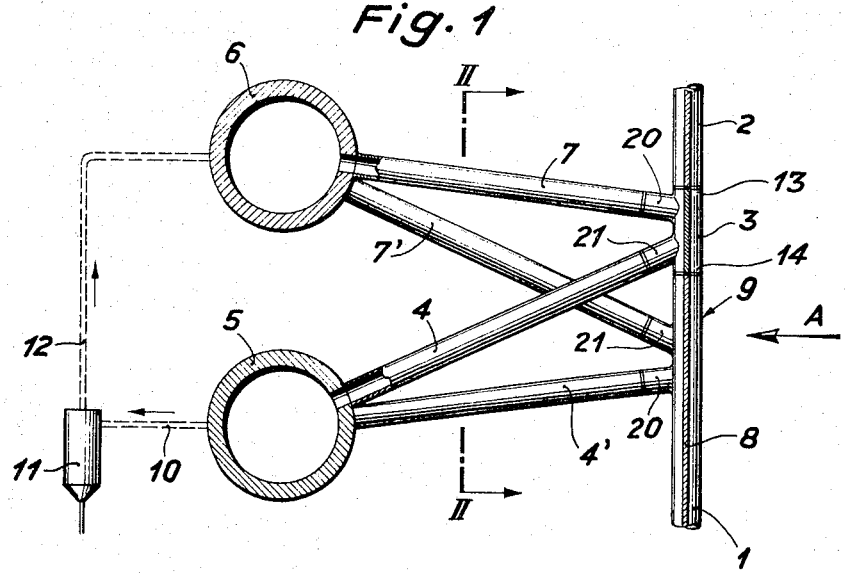
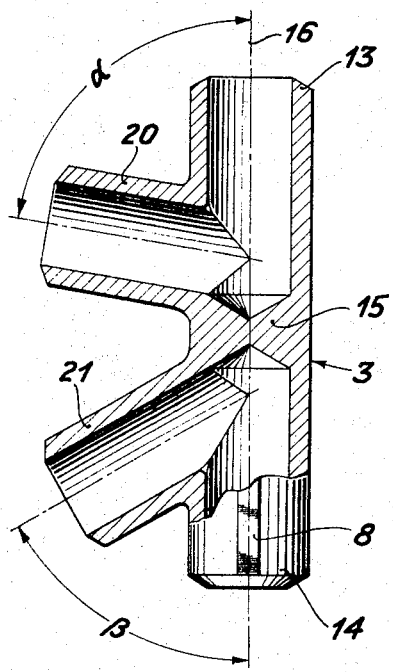
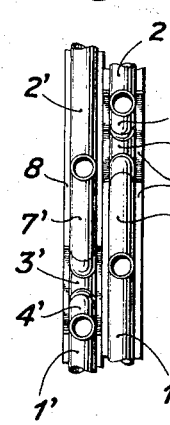
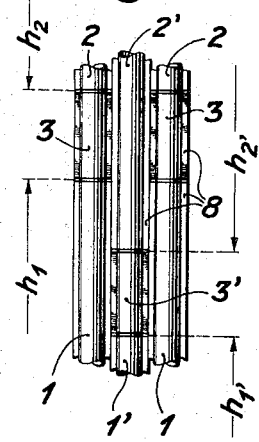
Inventor:
RICHARD LITWINOFF
BY Kenyon & Kenyon
ATTORNEYS

United States Patent Office 3,362,383
Patented Jan. 9, 1968

3,362,383
COMBUSTION CHAMBER WALL
Richard Litwinoff, Winterthur, Switzerland, assignor to Sulzer Brothers, Limited, Winterthur, Switzerland, a corporation of Switzerland
Filed May 17, 1966, Ser. No. 550,845
Claims priority, application Switzerland, June 15, 1965, 8,299/65
6 Claims. (Cl. 122—6)

ABSTRACT OF THE DISCLOSURE

The pipe sections are disposed in the lines between aligned pipes to divide the pipes into an evaporator heating surface and a superheater heating surface. The pipe sections have an intermediate closure to divert the flow of heated medium from the evaporator surfaces into and through a collector, a separator and a manifold to the superheater surfaces.

---

This invention relates to a combustion chamber wall. More particularly, this invention relates to a combustion chamber wall formed of parallel pipes which conduct working medium therethrough. Still more particularly, this invention relates to a combustion chamber wall of parallel pipes having a collector integrally connected with the pipes.

Here'ofore, combustion chamber walls have been constructed of pipe systems which have conducted the working medium through pipes; however, these pipes have been provided with pipe bends at the positions at which the working medium has been discharged from and fed into the system. Further, such pipe systems have been secured in complex manners to supporting scaffolding. All of these features have made the heretofore combustion chamber walls cumbersome and awkward to construct as well as susceptible of gas leakage.

Accordingly, it is an object of this invention to provide a combustion chamber wall of a plurality of parallel pipelines formed of coaxial pipes.

It is another object of this invention to provide a combustion chamber wall of a plurality of pipelines of coaxial pipes which can be simply supported at one end.

It is another object of this invention to provide a combustion chamber wall with an integrally connector collector.

It is another object of this invention to provide a pipe section having an intermediate closure for connecting a pair of coaxial pipes of a combustion chamber wall.

It is another object of this invention to provide a pipe section having an intermediate closure for connecting a pair of coaxial straight pipes of a combustion chamber wall integrally with a collector.

It is another object of this invention to provide a gas-tight combustion chamber wall.

Generally, the combustion chamber wall of the invention is constructed of a plurality of parallel pipelines to serve as the lining of the combustion chamber. Each pipeline is connected to a working medium source for the introduction of a working medium and each pipeline is constructed of straight pipes which are interconnected within a transfer zone by pipe sections having intermediate closures. The pipe section prevents direct passage of the working medium from one pipe to another. Instead, the pipe section is formed with a discharge socket and a feed socket on opposed sides of the closure for diverting the working medium from one pipe through a collector of a similar device before introduction into the other pipe.

The combustion chamber wall thus permits flow of working medium from the wall at one point therein and flow into the wall at another point while providing externally smooth and continuous pipe lines which substantially prevent the adherence of ash and slag particles thereon. In addition, the pipelines of the wall can be connected together to form a gas-tight wall and consequently a gas-tight chamber.

These and other objects and advantages of the invention will become more apparent from the following detailed description and appended claims taken in conjunction with the accompanying drawings in which:

FIG. 1 illustrates a sectional view through a pipe wall according to the invention;
FIG. 2 illustrates a view taken on line II—II of FIG. 1;
FIG. 3 illustrates a view taken in the direction indicated by arrow A in FIG. 1; and
FIG. 4 illustrates a partial sectional view of the pipe section of the invention.

Referring to FIGURES 1 and 3, a pipe wall 9 consists of a plurality of vertical pipes 1, 1' and 2, 2' which extend in parallel relation to each other only three being shown in FIGURE 3. The pipe wall 9 represents the boundary, for example, of a steam-raising combustion chamber which is exposed to the radiation of a firing system (not shown) being applied from the direction indicated by the arrow A in FIG. 1. The pipes 1 extend to a height $h$, whereas the pipes 1' extend to a height $h_1'$ in an alternating manner so that as in FIG. 3 the pipes on the right hand and left hand sides of each of the pipes 1 there will be pipes 1' which extend to the height $h_1'$. The pipes 2 or 2' which begin at the height $h_2$ or $h_2'$ are coaxially located in the same axis as the pipes 1 and 1'. The pipes 1 and 2 are joined by a pipe section 3 and the pipes 1' and 2' are joined by a pipe section 3', for example, by welding.

Referring to FIG. 4, each pipe section 3 is closed between its ends 13 and 14, for example, the closure may be obtained by making the pipe section in the form of a forging and by boring the two ends 13 and 14 to leave a wall 15 in the center. A socket 20 is provided at each pipe section near one side of the wall 15 on an axis located at an angle $\alpha$ to the axis 16 of the pipe section. Similarly, a socket 21 is connected near the other of the wall 15 on an axis located at an angle $\beta$ to the axis 16. The angle $\beta$ is of a different magnitude from the angle $\alpha$, in that it is smaller than the angle $\alpha$. It is noted that the pipe sections 3' are identical to pipe section 3; however, the pipe sections 3' are positioned in the pipes 1', 2' in an upside down relationship to pipes 3.

In accordance with the different heights of the pipes 1 and 1', the pipe sections 3 and 3' are disposed in the pipe wall in an offset manner in relation to each other. Because of this offset disposition, the pipe sections 3, 3' are more easily accessible for the purpose of welding discharge pipelines 4 or 4' and feed pipelines 7 or 7' into position with the pipe sockets 20 and 21. The angles $\alpha$ and $\beta$ respectively are so selected that the same pipe sections can be employed where the pipes 1 are not offset or even for a pipe wall of offset disposition. The discharge and feed pipelines need only be joined to the pipes 1 and 2 so that the end 13 of the pipe section 3 is at the top while in the pipes 1' and 2' the end 14 of the pipe section 3' is located at the top (FIG. 1).

In the example according to FIG. 1 the discharge tubes 4 and 4' terminate in a collector 5 which is joined through a pipeline 10 with a liquid separator 11. A pipeline 12 leads from the steam chamber of the liquid separator 11 to a manifold 6, to which the feed pipelines 7 and 7' are connected. The feed pipelines 7 and 7' terminate through corresponding sockets of the pipe sections 3 and 3' in the pipes 2 and 2'. The working medium flows upwards in pipes 1 and 1' which form an evaporator heating surface in this case, and passes through the collector 5 into the separator 11 downstream of the collector 5 wherein steam and water are separated from each other. The steam then flows through the manifold 6 and the feed pipes 7 and 7' into the tubes 2 and 2' which form a superheater heating surface wherein the steam is superheated.

In the example shown, the pipes 1, 1' and 2, 2' are provided with fins 8 which extend over the length of the pipes and through which all pipes are welded together to form a gas-tight wall. The pipe sections 3 and 3' are also provided with fins 8 which are in alignment with those of the pipes 1, 1', 2, 2' and are welded together so that the pipe wall is also gas-tight in the zone of the pipe sections. Alternatively, instead of providing each pipe and each pipe section with fins, it is also possible to weld separate connecting webs between the pipes and the pipe section.

Additionally, the pipe sections 3 are also useful where the pipes 2 of the superheater surfaces forming a wall are in a superjacent position and the working medium is discharged from between the superheater heating surfaces from the wall for later introduction into the wall either for the purpose of mixing the steam flows from the individual pipes and to redistribute them anew or to collect the steam flows and to influence their temperature by the injection of condensate before they enter in a fresh distribution into the next heating surface.

In the example shown in FIG. 3 welding seams are provided between the pipe sections 3 and 3' and on the pipes connected to the pipe sections at four different heights, that is, $h_1$, $h_2$, $h_1'$ and $h_2'$. This provides a so called "toothed" transfer from the lower heating surface to the upper heating surface. However, instead of this "toothed" transfer with welding seams distributed over four levels, a rectilinear transfer with welding seams distributed over two levels can be used. In this case the end 14 of the pipe section 3 is extended to the height $h_1'$ while the end of the pipe section 3' is extended to the height $h_2$ thereby causing the wall 15 in the respective pipe sections to be decentralized. Nevertheless, pipe sections 3 and 3' remain identical as to each other. The pipes 1 and 1' will then all extend to the height $h_1$, and the pipes 2 and 2' will all begin at height $h_2$.

The pipe sections can be produced not only by forging but also in other manners, for example, by welding a plate or cap into a tube to form the wall 15 and by drilling and flanging the connecting holes for the sockets 21 and 20. In this case the pipe lines 4, 4', 7 and 7' can be directly welded to the flanges.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:
1. A combustion chamber wall comprising a plurality of parallel pipelines forming a smooth continuous lining for conducting a working medium therethrough, each of said pipelines including a pair of spaced coaxial pipes and a pipe section interconnecting said pair of pipes and being in coaxial alignment with said pair of pipes, said pipe section having a closure intermediate the ends thereof, a discharge socket on one side of said closure for discharging working medium therethrough from one of said pair of pipes and a feed socket on the other side of said closing for feeding working medium therethrough into the other of said pair of pipes.

2. A combustion chamber wall as set forth in claim 1 wherein said discharge socket and said feed socket are disposed in angular relation to the axis of said pipe section, said discharge socket being disposed on an angle different from said feed socket.

3. A combustion chamber wall as set forth in claim 1 wherein the pipe sections of adjacent pipelines are disposed in an offset pattern.

4. A combustion chamber wall as set forth in claim 1 which further comprises connecting webs secured between adjacent pipes and pipe sections of adjacent pipelines for sealing the combustion chamber wall against gas flow therethrough.

5. A combustion chamber wall as set forth in claim 1 wherein adjacent pipes and pipe sections of adjacent pipelines are secured together to form a gas-tight wall.

6. In combination with a combustion chamber wall having a plurality of parallel pipelines for conducting a working medium therethrough, each of said pipelines including a pair of spaced coaxial pipes and a pipe section interconnecting said pair of pipes, said pipe section having a closure intermediate the ends thereof, a discharge socket on one side of said closure for discharging working medium therethrough from one of said pair of pipes and a feed socket on the other side of said closing for feeding working medium therethrough into the other of said pair of pipes, a collector interconnected to each said discharge socket for collecting working medium therein, a liquid separator connected to said collector downstream thereof for separating steam from the working medium passing therethrough, and a manifold connected between said separator and each said feed socket for feeding the separated steam into each said feed socket.

References Cited
UNITED STATES PATENTS

| | | | |
|---|---|---|---|
| 3,237,612 | 3/1966 | Koch et al. | 122—406 |
| 3,308,792 | 3/1967 | Lawton | 122—510 |

FOREIGN PATENTS

| | | |
|---|---|---|
| 978,699 | 12/1964 | Great Britain. |

KENNETH W. SPRAGUE, *Primary Examiner.*